(12) United States Patent
Otto et al.

(10) Patent No.: US 8,780,925 B2
(45) Date of Patent: Jul. 15, 2014

(54) MOBILE USE OF A PBX SYSTEM

(75) Inventors: Adrian Otto, Redondo Beach, CA (US); Samy Kamkar, Marina Del Rey, CA (US)

(73) Assignee: Fonality, Inc., Plano, TX (US)

( * ) Notice: Subject to any disclaimer, the term of this patent is extended or adjusted under 35 U.S.C. 154(b) by 1471 days.

(21) Appl. No.: 11/506,279

(22) Filed: Aug. 17, 2006

(65) Prior Publication Data

US 2006/0256789 A1 Nov. 16, 2006

(51) Int. Cl.
*H04L 12/66* (2006.01)
*H04Q 3/47* (2006.01)

(52) U.S. Cl.
USPC ....... 370/395.54; 370/352; 370/356; 379/289

(58) Field of Classification Search
CPC .................. H04Q 2213/13384; H04Q 3/0045; H04Q 2213/1322; H04I 61/25; H04I 63/0272; H04I 61/2575; H04I 65/2578; H04I 29/12528; H04I 65/1053
USPC ......... 370/389, 401, 254, 466–467, 352–356, 370/395.54; 709/245; 713/153–154, 160, 713/162, 171; 726/11–13; 379/221.02, 289, 379/219, 221.15, 355.01–355.09; 455/462, 455/465, 555
See application file for complete search history.

(56) References Cited

U.S. PATENT DOCUMENTS

| | | | |
|---|---|---|---|
| 4,653,090 A | 3/1987 | Hayden | |
| 5,533,110 A | 7/1996 | Pinard et al. | |
| 5,754,636 A | 5/1998 | Bayless et al. | |
| 5,854,834 A | 12/1998 | Gottlieb et al. | |
| 5,940,488 A | 8/1999 | DeGrazia et al. | |
| 6,067,525 A | 5/2000 | Johnson et al. | |
| 6,104,711 A * | 8/2000 | Voit | 370/352 |
| 6,137,869 A | 10/2000 | Voit | |
| 6,282,574 B1 | 8/2001 | Voit | |
| 6,359,880 B1 | 3/2002 | Curry | |
| 6,389,132 B1 | 5/2002 | Price | |
| 6,400,719 B1 * | 6/2002 | Chimura et al. | 370/395.31 |
| 6,418,214 B1 | 7/2002 | Smythe et al. | |
| 6,430,275 B1 | 8/2002 | Voit | |

(Continued)

FOREIGN PATENT DOCUMENTS

| | | |
|---|---|---|
| WO | 2004049121 A2 | 6/2004 |
| WO | 2005036330 A2 | 4/2005 |
| WO | 2006020168 A2 | 2/2006 |

OTHER PUBLICATIONS

Parmar, Rashik "Enhanced Enterprise Communication: Transforming the bank into a proactive relationship center." IBM Global Services. May 2004.

(Continued)

*Primary Examiner* — Asad Nawaz
*Assistant Examiner* — Wutchung Chu
(74) *Attorney, Agent, or Firm* — Carr & Ferrell LLP

(57) ABSTRACT

Systems and methods for utilizing a PBX identifier of a PBX system in a mobile environment are provided. In exemplary systems, an enhanced DNS server maintains a central registry of PBX identifiers and corresponding locations associated with the PBX identifiers. The corresponding locations may comprise both private and public IP address. When a remote IP device attempts to access their main office PBX system via the PBX identifier, the enhanced DNS server returns the private and public IP addresses in response.

20 Claims, 6 Drawing Sheets

(56) References Cited

U.S. PATENT DOCUMENTS

| | | |
|---|---|---|
| 6,430,289 B1 | 8/2002 | Liffick |
| 6,453,038 B1 | 9/2002 | McFarlane et al. |
| 6,628,765 B1 | 9/2003 | Bangs et al. |
| 6,718,030 B1* | 4/2004 | Turner et al. ............. 379/221.02 |
| 6,782,412 B2 | 8/2004 | Brophy et al. |
| 6,820,083 B1 | 11/2004 | Nagy et al. |
| 6,937,703 B1* | 8/2005 | Andreason ................. 379/88.17 |
| 6,964,370 B1 | 11/2005 | Hagale et al. |
| 7,007,074 B2 | 2/2006 | Radwin |
| 7,031,442 B1 | 4/2006 | Neyman et al. |
| 7,035,619 B1 | 4/2006 | Fargano et al. |
| 7,035,923 B1 | 4/2006 | Yoakum et al. |
| 7,039,165 B1 | 5/2006 | Saylor et al. |
| 7,065,184 B2 | 6/2006 | Vishik et al. |
| 7,076,036 B1 | 7/2006 | Johnson |
| 7,089,237 B2 | 8/2006 | Turnbull et al. |
| 7,092,509 B1 | 8/2006 | Mears et al. |
| 7,120,238 B1 | 10/2006 | Bednarz et al. |
| 7,136,875 B2 | 11/2006 | Anderson et al. |
| 7,194,531 B2 | 3/2007 | Donker et al. |
| 7,213,073 B1 | 5/2007 | Slavin |
| 7,274,781 B2 | 9/2007 | Lipton et al. |
| 7,333,976 B1 | 2/2008 | Auerbach et al. |
| 7,441,002 B1* | 10/2008 | Catchpole et al. ............. 709/205 |
| 7,477,730 B2 | 1/2009 | Starbuck et al. |
| 7,496,185 B1 | 2/2009 | Primavesi et al. |
| 7,496,189 B2 | 2/2009 | Clarisse et al. |
| 7,536,000 B2 | 5/2009 | Ho |
| 7,567,662 B1 | 7/2009 | Renner et al. |
| 7,586,908 B2* | 9/2009 | Nelson et al. ................. 370/353 |
| 7,606,221 B2* | 10/2009 | Artru et al. ..................... 370/352 |
| 7,664,096 B2* | 2/2010 | Doherty et al. ............. 370/352 |
| 7,664,495 B1* | 2/2010 | Bonner et al. ................. 455/433 |
| 7,685,010 B2 | 3/2010 | Goldberg et al. |
| 7,706,522 B2 | 4/2010 | Shaffer et al. |
| 7,711,104 B1 | 5/2010 | Flockhart et al. |
| 7,716,263 B2 | 5/2010 | Masek |
| 7,835,510 B2 | 11/2010 | Akachi |
| 7,844,677 B1 | 11/2010 | Asher et al. |
| 7,881,454 B2 | 2/2011 | Tuchman et al. |
| 7,920,549 B2* | 4/2011 | Alt et al. ....................... 370/352 |
| 7,983,404 B1 | 7/2011 | Croak et al. |
| 8,131,872 B2 | 3/2012 | Kennedy et al. |
| 8,132,001 B1* | 3/2012 | Patten et al. ................. 713/164 |
| 8,214,265 B2 | 7/2012 | Peters |
| 8,223,941 B2 | 7/2012 | White et al. |
| 8,379,832 B1 | 2/2013 | Lyman |
| 8,571,202 B2 | 10/2013 | Lyman |
| 8,693,659 B2 | 4/2014 | Lyman |
| 8,719,386 B2 | 5/2014 | Lyman et al. |
| 2002/0009073 A1* | 1/2002 | Furukawa et al. ............ 370/352 |
| 2002/0029258 A1 | 3/2002 | Mousseau et al. |
| 2002/0035605 A1 | 3/2002 | McDowell et al. |
| 2002/0116336 A1 | 8/2002 | Diacakis et al. |
| 2002/0120687 A1 | 8/2002 | Diacakis et al. |
| 2003/0002521 A1 | 1/2003 | Traversat et al. |
| 2003/0009530 A1 | 1/2003 | Philonenko et al. |
| 2003/0026414 A1 | 2/2003 | Baker et al. |
| 2003/0078986 A1 | 4/2003 | Ayres et al. |
| 2003/0219029 A1* | 11/2003 | Pickett .......................... 370/442 |
| 2003/0228010 A1 | 12/2003 | Clarisse et al. |
| 2004/0001573 A1 | 1/2004 | Gusler et al. |
| 2004/0039889 A1 | 2/2004 | Elder et al. |
| 2004/0062383 A1 | 4/2004 | Sylvain |
| 2004/0083306 A1* | 4/2004 | Gloe ............................. 709/245 |
| 2004/0088356 A1 | 5/2004 | Sellen et al. |
| 2004/0093387 A1 | 5/2004 | Wick |
| 2004/0107267 A1 | 6/2004 | Donker et al. |
| 2004/0133888 A1 | 7/2004 | Ard et al. |
| 2004/0141508 A1 | 7/2004 | Schoeneberger et al. |
| 2004/0170267 A1 | 9/2004 | Seligmann |
| 2004/0179672 A1 | 9/2004 | Pagel et al. |
| 2004/0203944 A1 | 10/2004 | Huomo et al. |
| 2004/0218747 A1* | 11/2004 | Ranalli et al. ............. 379/218.01 |
| 2004/0246331 A1 | 12/2004 | Caspi et al. |
| 2004/0260771 A1 | 12/2004 | Gusler et al. |
| 2004/0264670 A1 | 12/2004 | Flores et al. |
| 2004/0267887 A1 | 12/2004 | Berger et al. |
| 2005/0068166 A1 | 3/2005 | Baker |
| 2005/0068227 A1 | 3/2005 | Caspi et al. |
| 2005/0074101 A1 | 4/2005 | Moore et al. |
| 2005/0076095 A1 | 4/2005 | Mathew et al. |
| 2005/0105709 A1 | 5/2005 | Dutronc et al. |
| 2005/0111440 A1* | 5/2005 | Artru et al. ..................... 370/352 |
| 2005/0201362 A1 | 9/2005 | Klein et al. |
| 2005/0209861 A1 | 9/2005 | Hewes et al. |
| 2005/0220283 A1 | 10/2005 | Ho |
| 2005/0239501 A1* | 10/2005 | Idnani et al. ................. 455/554.2 |
| 2005/0243978 A1 | 11/2005 | Son et al. |
| 2005/0246588 A1 | 11/2005 | Deng et al. |
| 2006/0019655 A1 | 1/2006 | Peacock |
| 2006/0039545 A1 | 2/2006 | Rahman et al. |
| 2006/0093099 A1 | 5/2006 | Cho |
| 2006/0093121 A1 | 5/2006 | Sylvain |
| 2006/0100923 A1 | 5/2006 | Courchesne |
| 2006/0109811 A1 | 5/2006 | Schotten et al. |
| 2006/0117264 A1 | 6/2006 | Beaton et al. |
| 2006/0121916 A1 | 6/2006 | Aborn et al. |
| 2006/0146870 A1* | 7/2006 | Harvey et al. ................. 370/466 |
| 2006/0147009 A1 | 7/2006 | Greenlee et al. |
| 2006/0166678 A1 | 7/2006 | Karaoguz et al. |
| 2006/0167747 A1 | 7/2006 | Goodman et al. |
| 2006/0177032 A1* | 8/2006 | Abramson et al. ........ 379/201.01 |
| 2006/0185004 A1 | 8/2006 | Song et al. |
| 2006/0195532 A1 | 8/2006 | Zlateff et al. |
| 2006/0210046 A1 | 9/2006 | Smith |
| 2006/0212519 A1 | 9/2006 | Kelley et al. |
| 2006/0256789 A1 | 11/2006 | Otto |
| 2006/0256942 A1 | 11/2006 | Gatzke et al. |
| 2006/0288099 A1 | 12/2006 | Jefferson et al. |
| 2007/0011337 A1 | 1/2007 | Brown et al. |
| 2007/0061197 A1 | 3/2007 | Ramer et al. |
| 2007/0078708 A1 | 4/2007 | Yu et al. |
| 2007/0165640 A1 | 7/2007 | Fitchett et al. |
| 2007/0204218 A1 | 8/2007 | Weber et al. |
| 2007/0217434 A1* | 9/2007 | Welbourn ..................... 370/401 |
| 2007/0244973 A1 | 10/2007 | Pearson |
| 2007/0264977 A1 | 11/2007 | Zinn et al. |
| 2007/0268506 A1 | 11/2007 | Zeldin |
| 2008/0025316 A1 | 1/2008 | Zampiello et al. |
| 2008/0031228 A1 | 2/2008 | Gallant |
| 2008/0101567 A1 | 5/2008 | Baudino et al. |
| 2008/0103907 A1 | 5/2008 | Maislos et al. |
| 2008/0126216 A1 | 5/2008 | Flensted-Jensen et al. |
| 2008/0130856 A1 | 6/2008 | Ku et al. |
| 2008/0147831 A1 | 6/2008 | Redjaian et al. |
| 2008/0162701 A1 | 7/2008 | Ryabchun et al. |
| 2008/0215428 A1 | 9/2008 | Ramer et al. |
| 2008/0219423 A1 | 9/2008 | Lyman |
| 2008/0222174 A1 | 9/2008 | Lyman |
| 2008/0222549 A1 | 9/2008 | Lyman |
| 2008/0222656 A1 | 9/2008 | Lyman |
| 2008/0275785 A1 | 11/2008 | Altberg et al. |
| 2008/0313543 A1 | 12/2008 | Altberg et al. |
| 2009/0012373 A1 | 1/2009 | Raij et al. |
| 2009/0019094 A1 | 1/2009 | Lashley et al. |
| 2009/0022149 A1 | 1/2009 | Rosenberg et al. |
| 2009/0043657 A1 | 2/2009 | Swift et al. |
| 2009/0074159 A1 | 3/2009 | Goldfarb et al. |
| 2009/0076917 A1 | 3/2009 | Jablokov et al. |
| 2009/0080411 A1 | 3/2009 | Lyman |
| 2009/0100047 A1 | 4/2009 | Jones et al. |
| 2009/0106427 A1 | 4/2009 | Plumb |
| 2009/0116443 A1 | 5/2009 | Walker et al. |
| 2009/0141884 A1 | 6/2009 | Lyman |
| 2009/0170519 A1 | 7/2009 | Wilhoite et al. |
| 2010/0174807 A1 | 7/2010 | Lyman |
| 2010/0211660 A1* | 8/2010 | Kiss et al. ..................... 709/221 |
| 2010/0232585 A1 | 9/2010 | Lyman |
| 2010/0235223 A1 | 9/2010 | Lyman |
| 2010/0287481 A1 | 11/2010 | Sawada et al. |
| 2011/0286444 A1 | 11/2011 | Petrovykh |
| 2012/0266080 A1 | 10/2012 | Zellner et al. |
| 2013/0022038 A1 | 1/2013 | Cadiz et al. |

(56) References Cited

U.S. PATENT DOCUMENTS

| | | |
|---|---|---|
| 2013/0108035 A1 | 5/2013 | Lyman |
| 2013/0148800 A1 | 6/2013 | Lyman |
| 2013/0243181 A1 | 9/2013 | Sirstins et al. |
| 2014/0029745 A1 | 1/2014 | Lyman |

OTHER PUBLICATIONS

"Montgomery, Warren & Copeland, Rebecca ""Network Intelligence for Presence Enhanced Communication."" Nov. 2001. http://tools.ietf.org/id/draft-montgomery-copeland-presence-spirits-00.txt".

Ott, Jorg "Presence Aggregation in Endpoints." Technologie-zentrum Informatik, Jan. 2003.

Broder, et al., Search Advertising Using Web Relevance Feedback, 2008, pp. 1013-1022, Conference on Information and Knowledge Management, Proceeding of the 17th AC conference on Information and Knowledge Management. Yahoo Research. Oct. 2008.

Hull, et al., Enabling Context-Aware and Privacy-Conscious User Data Sharing, 2004, Proceedings of the 2004 IEEE International Conference on Mobile Data Management. Aug. 2004. Accessed Aug. 2011. http://ieeexplore.ieee.org/xpl/freeabs_all.jsp?arnumber=1324414.

User Guide, What is Xact View? Xact View User Guide, Schmooze Communications LLC 2008. Accessed Aug. 2011. www.schmoozecom.com. http://literature.schmoozecom.com/XactView/UserGuide/UserGuideXactView.pdf.

Inter-Tel, Inc. "Advanced Applications Design Guide for Contact Center Suite." Issue 1. Apr. 2006.

Enhanced Enterprise Communication: Transforming the bank into a proactive relationship center. May 2004.

Network Intelligence for Presence Enhanced Communication. May 2002.

Presence Aggregation in Endpoints. Jan. 15, 2003.

Hull, et al., Enabling Context-Aware and Privacy-Conscious User Data Sharing, 2004, Proceedings of the 2004 IEEE International Conference on Mobile Data Management. Jul. 2004.

Broder, et al., Search Advertising Using Web Relevance Feedback, 2008, pp. 1013-1022, Conference on Information and Knowledge Management, Proceeding of the 17th AC conference on Information and Knowledge Management. Oct. 26, 2008.

"What is Xact View?" Xact View User Guide, Schmooze Communications LLC 2008. www.schmooze.com.

* cited by examiner

MOBILE USE OF A PBX SYSTEM

BACKGROUND OF THE INVENTION

1. Field of the Invention

Embodiments of the present invention relate generally to IP communication and more particularly to mobile use of a PBX system and its associated PBX identifier.

2. Description of Related Art

Presently, many individuals work at least part of the time from their homes. When the individual takes an IP device such as an IP phone out of the office, the IP phone must know the location where their office PBX system resides on the Internet. This is required so that the IP phone can find their office PBX system, connect to the PBX system, and participate from their remote location using a broadband connection on the Internet as their mechanism to communicate back and forth with the PBX system.

Conventionally, the Internet is based on domain names, which resolve to IP addresses. These IP addresses are the logical location of an individual computing component or device on the Internet. Thus, the individual's IP phone has an IP address, and the PBX system at the office also has an IP address (different from the IP address of the individual's IP phone). Often, there is a name that is assigned to each IP address so that, for example, when a connection to a particular domain name is requested by the individual's IP phone, the correct IP address is determined by a DNS server.

Current systems require a system integrator/programmer to program or configure the PBX system and each IP phone. Typically, the PBX system is assigned a fixed IP address. That fixed IP address is then programmed into the IP phone, so that when the IP phone is taken offsite (i.e., external to the office), the IP phone will know how to connect to the PBX system.

Disadvantageously, the PBX systems and IP phones must be programmed or configured. This not only requires integrators/programmers to set up the PBX system and IP phones, but it also requires integrators/programmers any time the IP address associated with the PBX system should change. Furthermore, conventional systems cannot handle a dynamic IP address as the PBX systems and IP phones are all configured with a single, non-dynamic (fixed) IP address.

As a result of the above mention problems, there is a need for a system which can manage mobile use of a PBX system.

SUMMARY OF THE INVENTION

Embodiments of the present invention provide systems and methods for utilizing a PBX system in a mobile environment. In exemplary systems, an enhanced DNS server maintains a central registry of PBX server IP addresses as a location on the internet. The corresponding locations may comprise both private and public IP address.

At the PBX system, an address check module determines a private IP address for the PBX system on the LAN. At predetermined intervals, at start-up, and whenever the private IP address changes, the address check module will determine the new private IP address. A communication is then sent to the enhanced DNS server notifying the DNS server that a change in the location of the PBX system has occurred. In exemplary embodiments, the communication includes the private IP address of the PBX system.

The enhanced DNS server is able to determine the public IP address from which the communication is received from. Thus, the enhanced DNS server, in exemplary embodiments, will know both the private and public IP addresses associated with the PBX system and associated internet routers. The IP addresses are stored in a central registry associated with the enhanced DNS server.

When a remote IP device requests access to its main office PBX system, the request for an IP address associated with a given DNS domain name recurses through a standard DNS infrastructure to the enhanced DNS server. The enhanced DNS server then looks up the location associated with the PBX system and returns the associated private and public IP addresses in response. The remote IP device then communicates through a router IP address associated with the PBX system via the public IP address when used remotely, and communicates with the PBX system on the LAN via the private IP address when used locally.

DETAILED DESCRIPTION OF EXEMPLARY EMBODIMENTS

Embodiments of the present invention provide systems and methods for allowing a mobile IP (Internet Protocol) device to access and establish a communication connection with a main office PBX (private branch exchange) system. In exemplary embodiments, the mobile IP device is an IP phone which may be removed from the main office and utilized anywhere that has a network connection. The exemplary PBX system and the IP phone are configured to handle a PBX identifier (e.g., a host name of the PBX and/or a PBX extension) in a mobile setting. In exemplary embodiments, the PBX comprises an IP PBX.

Figure 1:
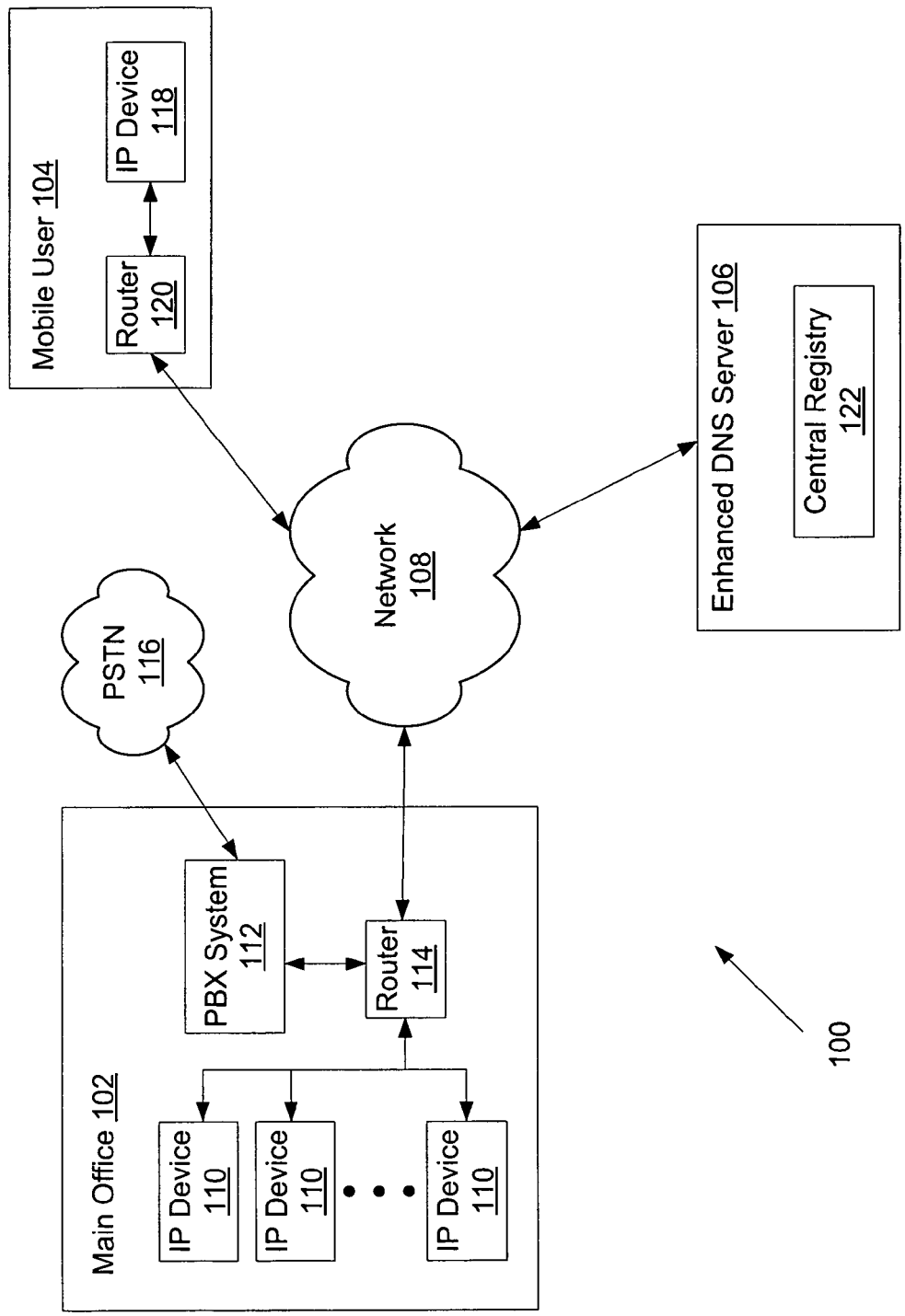
FIG. 1 is a diagram of an exemplary environment in which embodiments of the present invention may be practiced.

FIG. 1 shows an exemplary environment 100 in which embodiments of the present invention may be practiced. The exemplary environment 100 comprises a main office 102, a mobile user 104, and an enhanced DNS server 106 coupled in communication via a network 108. The network 108 may comprise the Internet.

The main office 102 comprises a plurality of IP devices 110 coupled to a PBX system 112 via a main router 114. Other devices which are not IP enabled may also be coupled to the PBX system 112. For example, corded or cordless analog phones may be coupled to the PBX system 112 in order to access the public switched telephone network (PSTN 116).

The PBX system 112 sits on a local area network (LAN) of the main office 102. The PBX system 112 is coupled to the network 108 through the main router 114, which in some embodiments has an integrated firewall. On the public (network 108) side, the PBX system 112 has a public IP address, which is the external IP address of the main router 114. On the local (LAN) side, a private IP address for the PBX system 112 exists to allow use of the PBX system 112 on the LAN (e.g., by the IP devices 110 on the LAN). The PBX system 112 will be discussed in more detail in connection to FIG. 4 below.

The mobile user 104 is any individual associated with the main office 102 which is accessing the main office 102 externally. For example, the mobile user 104 may be working from a home office. The mobile user 104 removes an IP device (i.e., mobile IP device 118) from the main office 102. This mobile IP device 118 is typically identical to the IP devices 110 located at the main office 102. Once removed, the mobile IP device 118 will access the main office 102 via a mobile (e.g. remote) router 120. It should be noted that "mobile" as used herein refers to any environment external to the main office 102 and/or the LAN.

In exemplary embodiments, the IP devices 110 and 118 are any computing devices that are IP enabled for communication, such as a desktop computer, a laptop, or an IP phone. To simplify discussion, the following detailed description will focus on the embodiment in which the IP devices 110 and 118 are IP phones. In exemplary embodiments, these IP phones do not require configuration in order to operate within and outside of the main office 102. That is, the mobile IP device 118 does not need to be configured with a fixed PBX location in order to access the PBX system 112 at the main office 102.

In exemplary embodiments, the enhanced DNS server 106 is configured to provide both DNS service as well as PBX system 112 tracking. The enhanced DNS server 106 comprises a central registry 122 which stores the external/public IP address (e.g., the address of the main router 114 coupled to the PBX system 112) and the internal/private IP address (e.g., the address of the PBX system 112 on the LAN) associated with the PBX, a PBX extension, and/or the associated PBX identifier. A PBX extension comprises a component of the PBX system 112 that allows an interactive receipt and/or placement of calls. In exemplary embodiments, each PBX extension comprises a number assigned to an individual (e.g., employee). The enhanced DNS server 106 will be discussed in more detail in connection with FIG. 3.

It should be noted that the embodiment of FIG. 1 is exemplary. Alternative embodiments may comprise any number of main offices 102, PBX systems 112, mobile users 104, and IP devices 110 and 118 coupled in communication with the enhanced DNS server 106.

Figure 2:
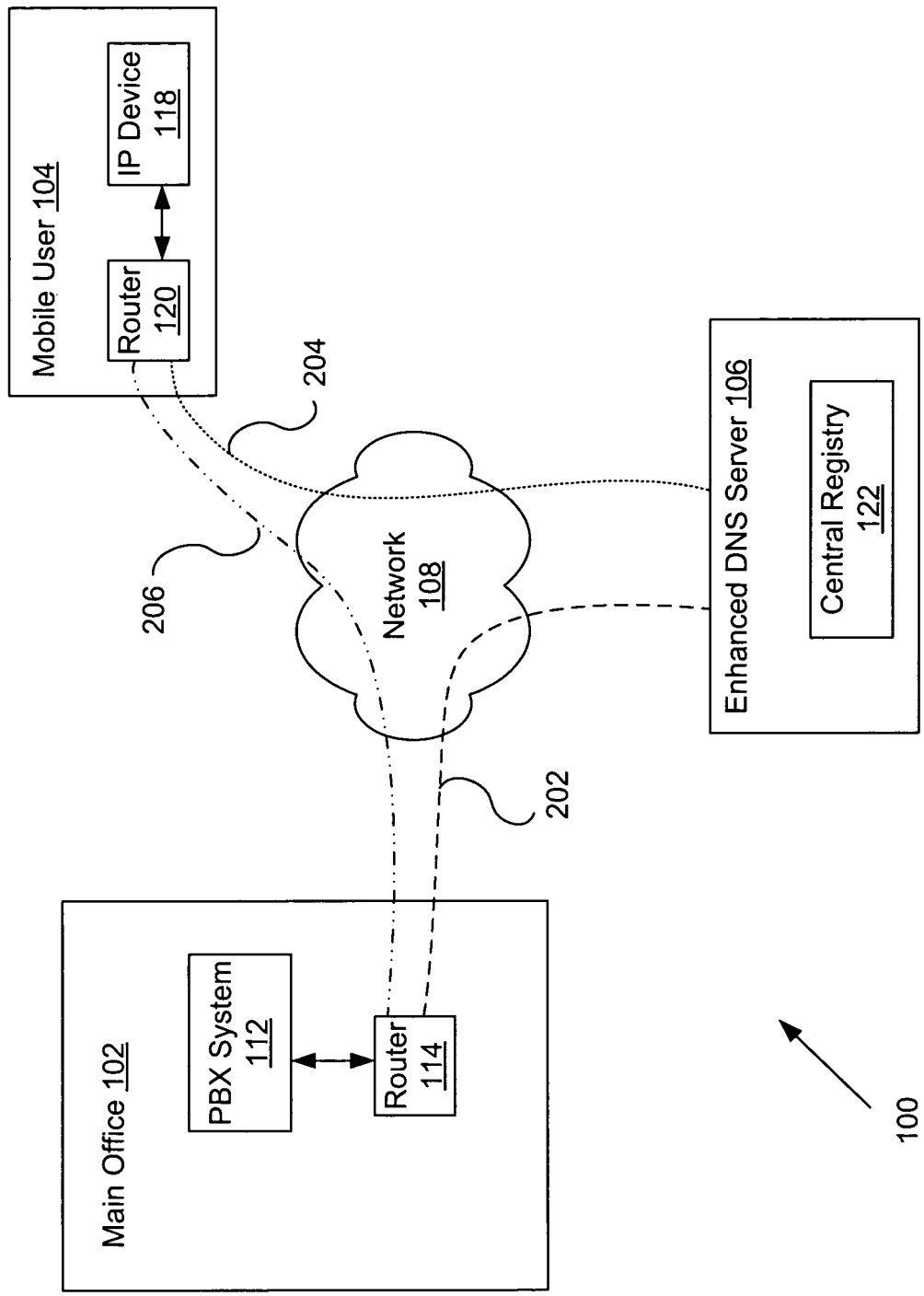
FIG. 2 is a diagram of exemplary communication paths with the environment of FIG. 1.

Referring now to FIG. 2, exemplary communication paths within the environment 100 are shown. In exemplary embodiments, the PBX system 112 via the router 114 initiates and maintains a communication channel 202 with the enhanced DNS server 106. This communication channel 202 may be initiated upon boot-up of the PBX system 112.

In some embodiments, the communication channel 202 is a virtual private network (VPN) connection. In these embodiments, the PBX system 112 makes an outbound transmission control protocol (TCP) connection to a port 8000 at the enhanced DNS server 106. A point-to-point protocol (e.g., generic routing encapsulation tunnel) is then established between the PBX system 112 and the enhanced DNS server 106 resulting in the VPN. Thus, once the PBX system 112 connects with the enhanced DNS server 106, it is as if the PBX system 112 is on the enhanced DNS server's network. While some embodiments utilize a VPN connection, alternative embodiments may utilize any form of communication or connection between the PBX system 112 and the DNS server 106.

In some embodiments, the communication channel 202 is maintained resulting in a continual communication between the PBX system 112 and the enhanced DNS server 106. This allows for substantially real-time updates to be communicated. For example, the enhance DNS server 106 will make sure that the PBX system 112 is running the most current version of a configuration. Furthermore, the enhanced DNS server 106 can troubleshoot the PBX system 112, monitor the status of the PBX system for errors, and remotely configure the PBX system 112. The PBX system 112, in turn, is communicating back where its location (i.e., private IP address) is on the LAN. The location information may then be stored in the central registry 122.

The IP device 118 of the mobile user 104 is not programmed with the location of their main office 102 PBX system 112. Instead upon start-up, the IP device 118 will automatically search for, and connect to, the PBX system 112 by looking for the PBX identifier or IP address which, in some embodiments, is a DNS host name (e.g., the domain name) of the PBX system 112. The search occurs in an automated fashion which does not require any participation of the mobile user 104. Accordingly, the IP device 118 will via the remote router 120, establish a communication path 204 which recurses through a standard DNS infrastructure on the network 108 until it reaches the enhanced DNS server 106. Based on the requested identifier or DNS host name, the enhanced DNS server 106 provides the current corresponding location (i.e., IP addresses) stored at the central registry 122.

In exemplary embodiments, the PBX system 112 is assigned an identifier, such as domain name which is maintained for the life of the installation. For example, if the PBX system 112 has a serial number of "1500", the domain name of the PBX system 112 may be "s1500.pbxtra.fonality.com." Thus, the IP device 118 will recurse through the DNS infrastructure (which may comprise one or more generic DNS servers) until the enhanced DNS server 106 (e.g., fonality.com) is reached. The enhanced DNS server 106 then looks up the corresponding IP addresses based on the serial number (e.g., 1500).

In one embodiment, the IP device 118 receives the IP addresses of the PBX system 112 and establishes a communication path 206 with the PBX system 112 via the router 114 of the main office 102. Subsequently, the IP device 118 can be utilized for IP phone operations. In an alternative embodiment, the enhanced DNS server 106 may notify the PBX system 112 to initiate a communication link with the IP device 118 instead of returning the IP addresses to the IP device 118.

Figure 3:
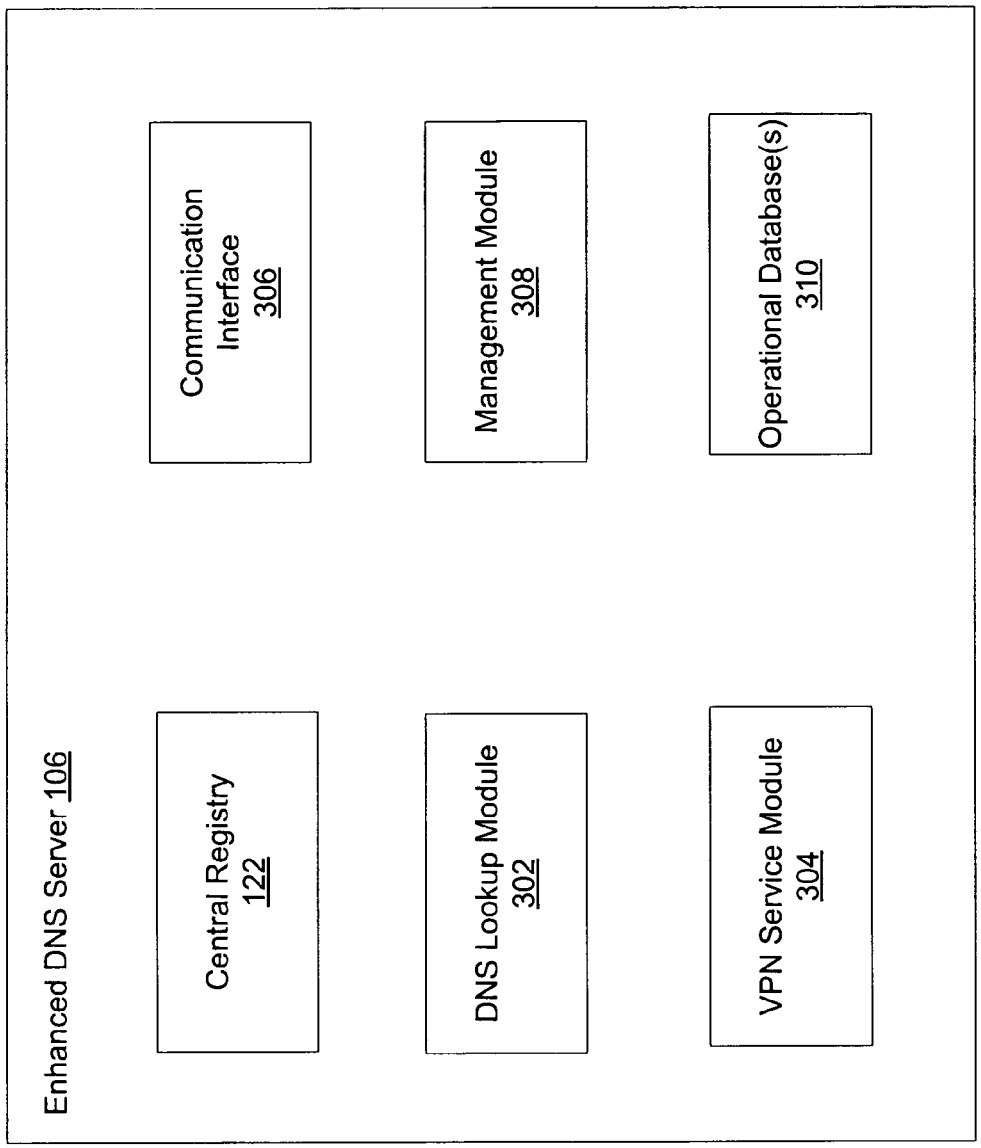
FIG. 3 is a block diagram of an enhanced DNS server, according to one embodiment of the present invention.

Referring now to FIG. 3, the enhanced DNS server 106 is shown in more detail with a functional block diagram. In exemplary embodiments, the enhanced DNS server 106 comprises the central registry 122, a DNS lookup module 302, a VPN service module 304, a communication interface 306, a management module 308, and one or more operational databases 310 coupled in communication. It should be noted that more, less, or functionally equivalent components may be embodied within the enhanced DNS server 106. For example, one or more of the modules may be optional. Additionally, components irrelevant to embodiments of the present invention are not shown. In exemplary embodiments, various components of the DNS server 106 are stored in, or associated with, a memory device of the DNS server 106.

As previously described, the central registry 122 contains location information for the PBX system 112. Any number of PBX systems 112 (FIG. 1) from any number of main offices 102 (FIG. 1) may be providing location information to the central registry 122. In exemplary embodiments, the central registry 122 will comprise a listing of PBX system identifiers (e.g., domain names or some equivalent identifier) and the logical location (e.g., public and private IP addresses) of each PBX system 112 on the network 108 (FIG. 1) and LAN. For example, the PBX system 112 identifier or domain name may be "s1500.pbxtra.fonality.com" and the private IP address is 192.168.1.10 while the public IP address is 12.13.14.15.

While the embodiments of FIG. 1 to FIG. 3 show a single central registry 122 being located within the enhanced DNS server 106, alternative embodiments may contemplate having one or more central registries 122. For example, a plurality of central registries 122 may be provided based on location (e.g., one registry for main offices 102 located in California and one registry for main offices 102 located in Nevada), company names (e.g., one registry containing companies A-L and one registry containing companies M-Z), or any other criteria. Furthermore, the central registry 122 may be located external to the enhanced DNS server 106 (anywhere on the network 108) but be coupled to the enhanced DNS server 106.

The exemplary DNS lookup module 302 is configured to access the central registry 122 in order to find the IP addresses corresponding to a requested PBX identifier. For example, the DNS lookup module 302 will receive a request for connection to the PBX system 112 from the remote IP device 118, and search the central registry 122 for the corresponding IP addresses. In a further embodiment, the DNS lookup module 302 may receive a request from a local IP device 110 and return a corresponding private IP address.

In exemplary embodiments where a VPN connection is maintained between the main office 102 and the enhanced DNS server 106, the VPN service module 304 is utilized. The VPN service module 304 is configured to maintain and monitor the connection along with providing any support which may be needed for the VPN connection. In some embodiments, the VPN service module 304 is configured to determine the public IP address from which the private IP address information for the PBX system 112 is received. This public IP address is then stored with the private IP address in the central registry 122.

The exemplary communication interface 306 provides the enhanced DNS server 106 with access to the network 108. In some embodiments, the communication interface 306 comprises a port 8000, but may be configured to use any TCP/IP or UDP/IP port number. Alternative forms of communication interfaces 306 are also contemplated. It should be noted that any number of communication interfaces 306 may be embodied within the enhanced DNS server 106.

The exemplary (web-based) management module 308 configures and adjusts any configurable aspects of the PBX system 112. For example, the management module 308 may allow for the recording of voice prompts or setting up an order of extensions compiled when a main menu of a phone system is reached, and so forth.

The operational database(s) 310 contain data not related to the location data of the PBX system 112. Thus, the operational database(s) 310 may contain client registration and service plans, billing information, client contact information, etc. It should be noted that, in alternative embodiments, the operational databases(s) 310 may be located external to the enhanced DNS server 106 and be coupled thereto.

Figure 4:
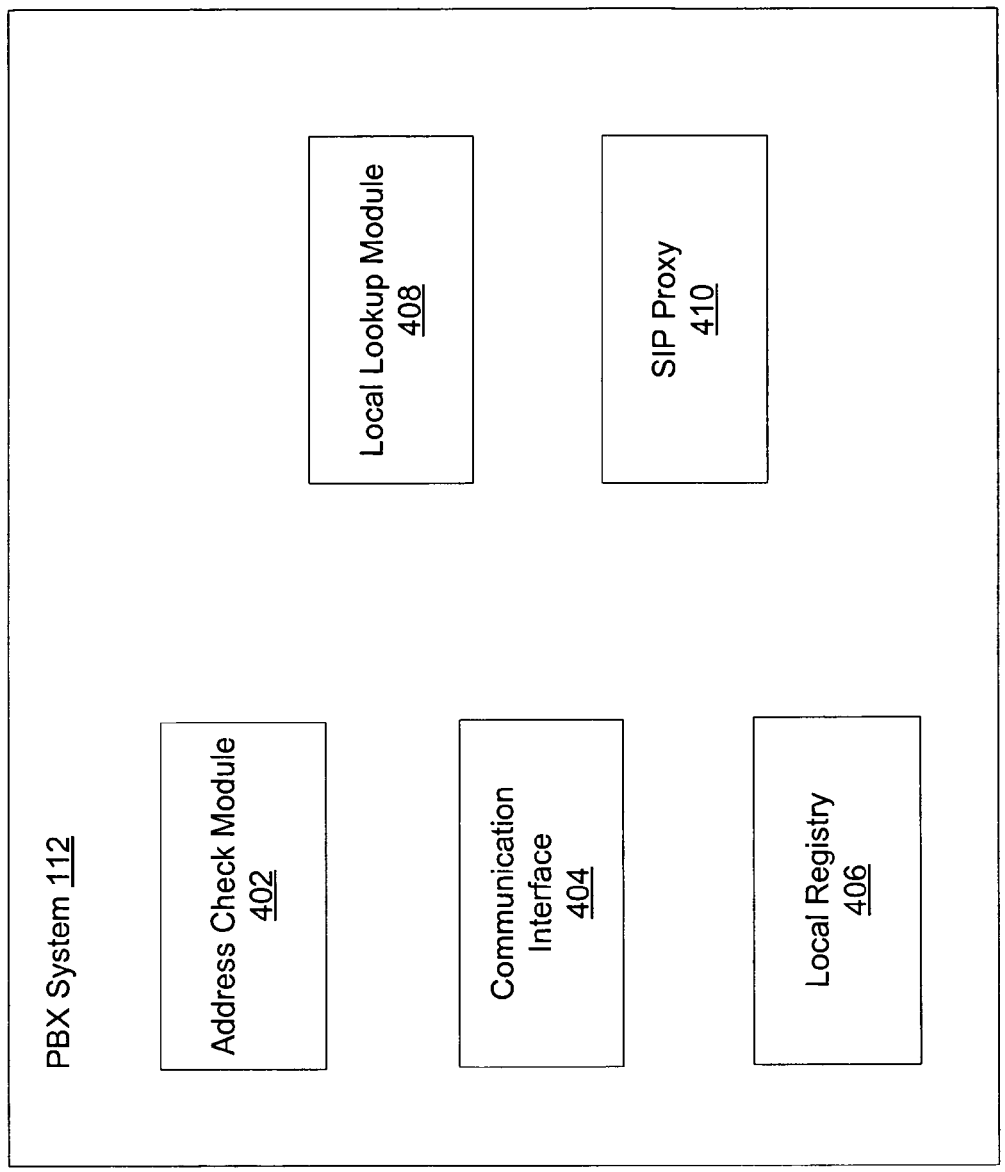
FIG. 4 is a block diagram of an exemplary PBX system, according to one embodiment of the present invention.

Referring now to FIG. 4, the exemplary PBX system 112 is shown in more detail utilizing a functional block diagram. According to one embodiment, the PBX system 112 comprises an address check module 302, a communication interface 304 a local registry 306 a local lookup module 308 and a SIP proxy 310 coupled in communication. It should be noted that other components not vital to functionality of embodiments of the present invention are not shown.

In exemplary embodiments, the address check module 402 provides the internal location information for the PBX system 112 on the LAN to the enhanced DNS server 106 (FIG. 1). Anytime the private IP address of the PBX system 112 changes, the address check module 402 notifies the enhanced DNS server 106 of the change. Thus, when the PBX system 112 first boots up, the address check module 402 establishes a connection (e.g., communication path 202 of FIG. 2) with the enhanced DNS server 106, and provides the private IP address of the PBX system 112.

If the PBX system 112 should go down, for example, due to a power failure or loss of network connection, the address check module 402 will, upon restart, automatically check for their current private IP address and forwards an update to the enhanced DNS server 106. It should be noted that restart may result in IP addresses (private, public, or both) that is different from the IP addresses previously recorded for the PBX system 112 before the power failure or loss of connection. Because the address check module 402 continually updates the enhanced DNS server 106 with the most current private IP address, embodiments of the present invention are capable of dealing with dynamic IP addresses. Thus, the mobile IP device 118 will be able to find and connect to the PBX system 112 regardless of the IP address at which the PBX system 112 is currently located.

In some embodiments, the address check module 402 pings or checks the private IP address at set intervals of time to insure that the private IP address has not changed. If a change is discovered, the address check module 402 notifies the enhanced DNS server 106.

In these exemplary embodiments, the address check module 402 looks for the PBX system's locally configured address, which is the private IP address. When the address check module 402 communicates with the central registry 122, the enhanced DNS server 106 can determine what public IP address, the address check module 402 is communicating from, which reveals the public interface. The enhanced DNS server 106, thus knows both the private and public IP addresses associated with the PBX system 112. These IP addresses may be passed on to the remote IP device 118.

The communication interface 404 provides a mechanism through which the PBX 112 system accesses the outside networks (e.g., PSTN 116 or network 108 through router 114). That is, the communication interface allows the PBX system 112 to communicate with the outside networks. The communication interface may comprise various ports, such as an Ethernet port, or other devices.

The local registry 406 comprises the private IP address for the PBX system 112. This is provided such that if the connection with the enhanced DNS server 106 is severed, the local IP devices 110 will not have their service interrupted. In some embodiments, the local IP devices 110 will check with the local registry 406 first for the private IP address of the PBX system 112. If the local registry 406 cannot provide the information, then the local registry 406 will, in turn, check with the enhanced DNS server 106 for the associated IP address. In alternative embodiments the IP device(s) 110 will check directly with the enhanced DNS server 106. In either case, the local IP device 110 will access the PBX system 112 via the private IP address.

The local lookup module 408 is configured to access the local registry 406 in order to find the private IP address corresponding to the requested identifier of the PBX system 112. That is, the local lookup module 408 will receive a request to connect to the PBX system 112, and search the local registry 406 for the corresponding private IP address to connect to.

The SIP (session initiation protocol) proxy 410 comprises a SIP protocol that indicates call features. That is, the SIP protocol comprises a signaling protocol that indicates when a call starts or ends. The SIP proxy 410 also controls the transportation of media stream over real-time transport protocol (RTP). Alternative embodiments may contemplate using other proxies and protocols.

In exemplary embodiments, the identifier (e.g., domain name) of the PBX system 112 requested by both the local IP devices 110 and the remote IP device 118 is the same identifier. That is, for example, both IP devices 110 and 118 will request access to the PBX system 112 having a domain name "s1500.pbxtra.fonality.com." This eliminates the need for a system administrator to maintain two separate identifiers or domain names (i.e., one name for internal/private IP address and one name for external/public IP address) or to make a distinction as to which IP device 110 and 118 is used internally and externally. The local IP devices 110 are resolved locally (by the PBX system 112) and given the private address (e.g., 192.168.1.10). In contrast, the remote IP device 118 will recurse to the central registry 122 at the enhanced DNS server 106 and be given the public and private IP addresses.

Figure 5:
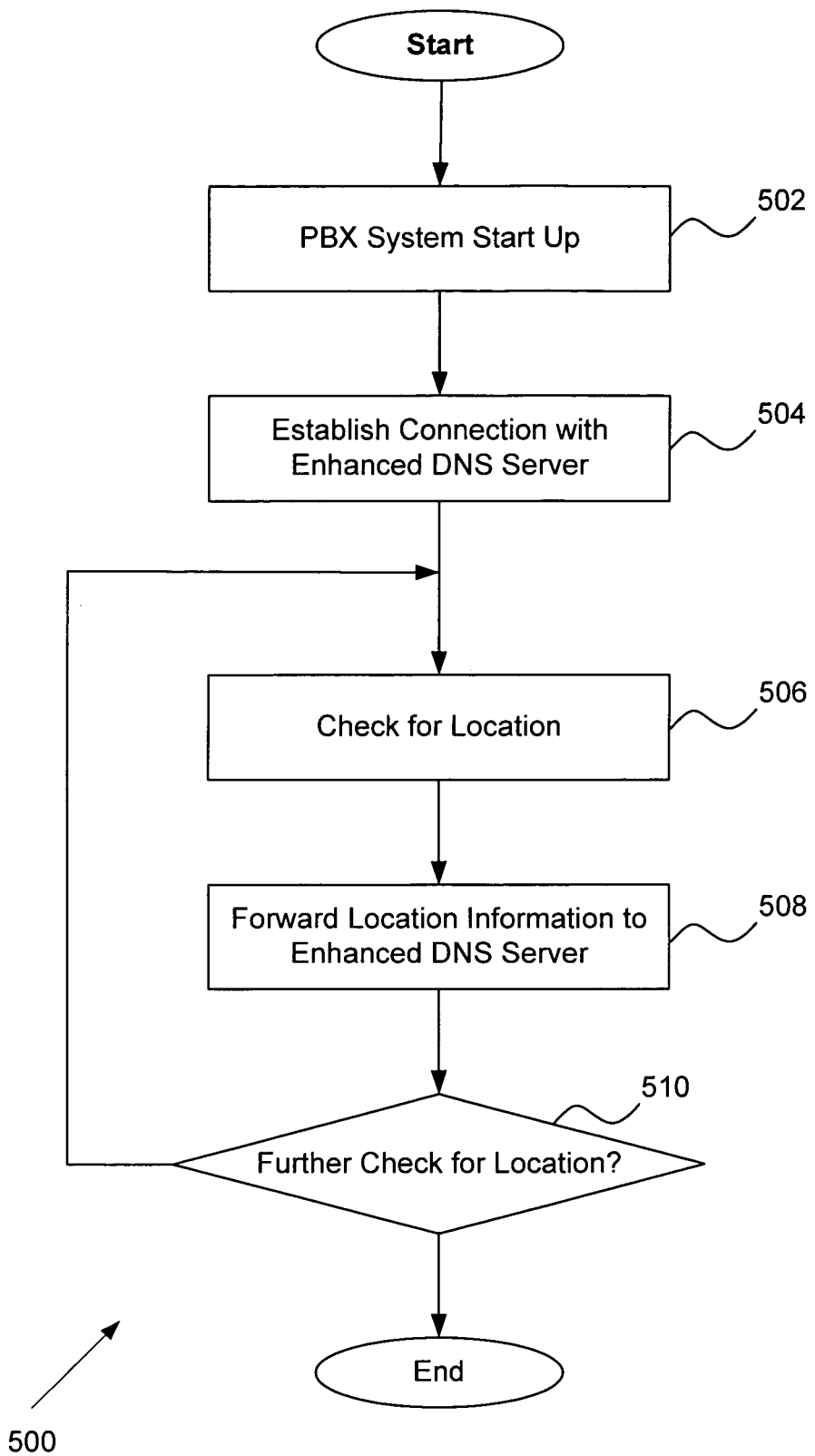
FIG. 5 is a flowchart of an exemplary method for tracking the location of the PBX system.

FIG. 5 is a flowchart 500 of an exemplary method for tracking the location of the PBX system, according to one embodiment of the present invention. In step 502, the PBX system 112 (FIG. 1) starts up. This may occur during the initial set up of the PBX system 112, which then remains constantly on. Alternatively, the PXB system 112 may be turned off and turned back on at regular intervals (e.g., nightly or once a week), or the PBX system 112 may initialize after an unscheduled shut down (e.g., power failure or loss of network connection).

Once the PBX system 112 starts up, the PBX system 112 establishes a connection with the enhanced DNS server 106 (FIG. 1) via the coupled router 114 (FIG. 1) in step 504. In some embodiments, the connection is a communication channel 202 comprising a virtual private network (VPN) connection. In these embodiments, the PBX system 112 makes an outbound transmission control protocol (TCP) connection to a port 8000 at the enhanced DNS server 106. A point-to-point protocol (e.g., generic routing encapsulation tunnel) is then established between the PBX system 112 and the enhanced DNS server 106 resulting in the VPN. In some embodiments, the communication channel 202 is maintained, resulting in continual communication between the PBX system 112 and the enhanced DNS server 106. Alternative embodiments may contemplate establishing the communication channel 202 whenever a new location is available for forwarding to the enhanced DNS server 106, or may comprise a non-VPN connection.

Next in step 506, the address check module 402 (FIG. 4) determines the local location of the PBX system 112. In exemplary embodiments, the local location is the private IP address of the PBX system 112 on the LAN.

The private IP address is forwarded to the enhanced DNS server 106 in step 508. While the address check module 402 provides the private IP address of the PBX system 112, the enhanced DNS server 106 is able to determine the public IP address from which the private IP address is being sent from. The enhanced DNS server 106 then may store both the private and public IP addresses associated with the PBX system 112 (and its domain name) in the central registry 122.

If there is a further check for location in step 510, the address check module 402 will perform the check and forward the location to the enhanced DNS server 106. A further check for location may be triggered automatically (e.g., any time the private IP address changes), be based on a scheduled time, or occur upon a restart of the PBX system 112. For example, if the PBX system 112 loses power or connection to the network 108, upon regaining power or the connection, the address check module 402 will perform another check for location of the PBX system 112.

Figure 6:
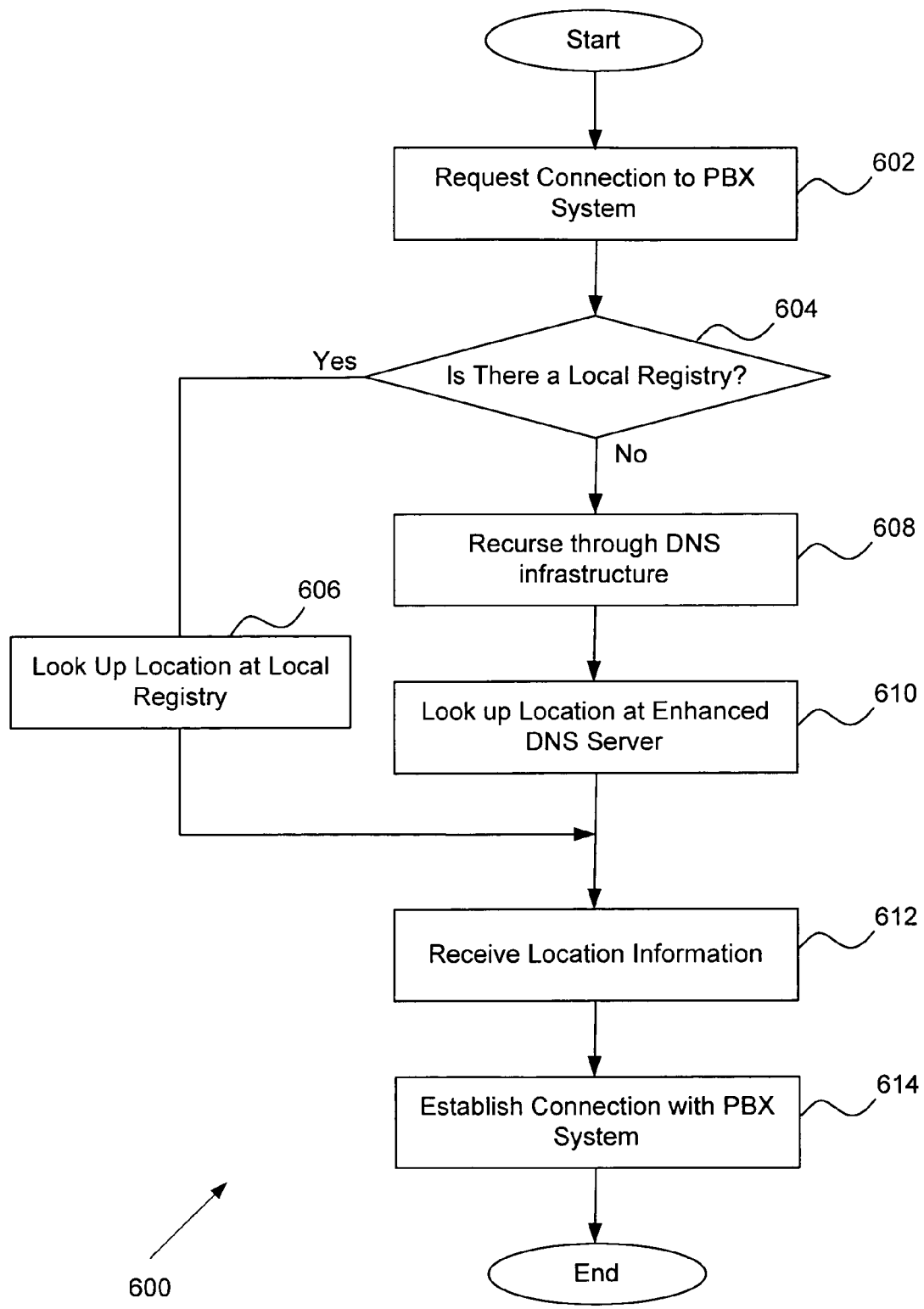
FIG. 6 is a flowchart of an exemplary method for coupling an IP device to the PBX system.

Referring now to FIG. 6, a flowchart 600 of an exemplary method for coupling an IP device 110 or 118 (FIG. 1) to the PBX system 112 (FIG. 1) is shown. In step 602, the IP device 110 or 118 attempts to access the PBX system 112. In exemplary embodiments, the IP device 110 or 118 requests a connection to the PBX system 112 via the PBX identifier (e.g., domain name of the PBX system 112). In some embodiments, the identifier of the PBX system 112 is the same irrespective of whether the IP device(s) 110 and 118 are local/internal or remote/external to the main office 102 (FIG. 1). That is, for example, both the local IP device 110 and the remote IP device 118 attempt to find the PBX system 112 located at the domain name "s1500.pbxtra.fonality.com." It should be noted that alternative embodiments may comprise a different domain name for the local/internal IP device 110 versus the remote/external IP device 118.

The request for the location of the PBX system 112 goes to a local resolver which, in some embodiments, determines if there is a local registry containing the information (step 604). For example, if the IP device 110 is a local/internal IP device, then the resolver will query the local registry 406 (FIG. 4) in the PBX system 112 for the internal IP address in step 606.

If, however, there is no local registry, the resolver recurses through a DNS infrastructure on the network 108. The recursion may include routing through a DNS root server for ".com" domains, for example, until the enhanced DNS server 106 is found. The enhanced DNS server 106 comprises the authority for the domain name of the PBX system 112 (e.g., s1500.pbxtra.fonality.com).

The enhanced DNS server 106 looks up the location associated with the identifier or domain name in step 610. In exemplary embodiments, the DNS lookup module 302 accesses the central registry 122 (FIG. 1) to determine the most current location recorded for the PBX system 112 (e.g., based on the serial number associated with the identifier or domain name). The location information (e.g., public and private IP addresses) is then sent back to the requesting remote IP device 118.

The remote IP device 118 receives the information in step 612 and establishes a connection with the PBX system 112 in step 614. Thus, the public IP address is used to connect the IP device 118 to the router 114 at the main office 102, while the private IP address is used to connect to the PBX system 112 on the LAN. Once the connection is established, the remote IP device 118 will be able to operate (e.g., initiate and maintain IP phone calls) via the PBX system 112.

In an alternative embodiment, the enhanced DNS server 106 will, instead of returning the IP address to the IP device 118, notify the PBX system 112 to initiate a connection with the IP device 118.

In further alternative embodiments, the DNS server 106 only returns a public IP address. The IP device 118 then connects to the router 114 via the public IP address. Once coupled to the router 114, the IP device 118 will execute a search for the private IP address via the local lookup module 408 (FIG. 4). In these alternative embodiments, the address check module 402 may send a communication to the DNS server (after a location change) which may not comprise the private IP address.

The above-described components and functions can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A system for allowing mobile use of a single private branch exchange (PBX) identifier on a network, comprising:
    an enhanced domain name system (DNS) server configured to receive a communication containing a first private Internet protocol (IP) address for a PBX system coupled to the network, the enhanced DNS server maintaining a communication channel with the PBX system, the DNS server further comprising,
        a service module, executable by a processor and stored in a memory, the service module configured to determine a public IP address from which the received communication was sent;
        a central registry configured to store the first private IP address, the public IP address, and the corresponding single PBX identifier, wherein the single PBX identifier is the same for internal and external IP devices utilizing the PBX system;
        a DNS lookup module configured to determine the first private IP address based on the single PBX identifier, wherein if the communication channel is a virtual private network (VPN) connection then the PBX system makes an outbound connection to a port at the enhanced DNS server; and
    an address check module configured to determine when the first private IP address has changed to a different private IP address due to information changes regarding the PBX system on the network, and inform the DNS server that the PBX system is using the different private IP address.

2. The system of claim 1 further comprising the PBX system.

3. The system of claim 2, wherein the PBX system further comprises an address check module, the address check module being configured to determine the private IP address and forward the private IP address to the enhanced DNS server.

4. The system of claim 1 wherein the single PBX identifier comprises a domain name of the PBX system.

5. The system of claim 1 wherein the DNS lookup module is further configured to determine the public IP address based on the single PBX identifier.

6. The system of claim 1 wherein the DNS lookup module is further configured to distinguish whether a requesting IP device is internal or external to the PBX system, whereby a private IP address is returned for an internal IP device and both the public and private IP addresses are returned for an external IP device.

7. The system of claim 1 wherein the IP device comprises an IP phone.

8. The system of claim 1 further comprising at least one Internet protocol (IP) device.

9. The system of claim 1, wherein the enhanced DNS server notifies the PBX system to initiate a communication link with the requesting IP device.

10. The system of claim 1, wherein the enhanced DNS server further comprises a VPN service module adapted to communicate with the PBX system.

11. A method for allowing mobile use of a single private branch exchange (PBX) identifier on a network, comprising:
    determining a public Internet protocol (IP) address and a private IP address associated with the PBX identifier;
    continually updating the private IP address using an address check module that determines when the first private IP address has changed to a different private IP address due to information changes regarding a PBX system on the network and informs an enhanced domain name system (DNS) server that the PBX system is using the different private IP address;
    establishing a virtual private network (VPN) connection between the PBX system and the enhanced DNS server comprising a central registry associated with the enhanced DNS server maintaining a communication channel with the PBX system, wherein if the communication channel is a VPN connection then the PBX system makes an outbound connection to a port at the enhanced DNS server;
    storing the public IP address, the private IP address, and the PBX identifier in the central registry; and
    providing the public IP address in response to a request from a remote IP device to access the PBX system associated with the single PBX identifier.

12. The method of claim 11 further comprising checking for the private IP address of the PBX system associated with the single PBX identifier and forwarding the private IP address for storage at the central registry.

13. The method of claim 12 further comprising providing the private IP address to the remote IP device based on the single PBX identifier.

14. The method of claim 12 further comprising providing the private IP address to a local IP device based on the single PBX identifier.

15. The method of claim 12 wherein the checking occurs at a predetermined interval.

16. The method of claim 11 wherein determining the public IP address comprises determining the public IP address from which a communication from the PBX system is sent.

17. The method of claim 11 wherein the communication comprises a private IP address.

18. The method of claim 11 wherein providing the public IP address comprises looking up the public IP address in the central registry based on the corresponding single PBX identifier.

19. The method of claim 11 wherein the single PBX identifier is a domain name of the PBX system.

20. A non-transitory machine readable medium having embodied thereon a program, the program providing instructions for a method for allowing mobile use of a single private branch exchange (PBX) identifier on a network, the method comprising:
    determining a public Internet protocol (IP) address associated with the PBX identifier and determining a private, dynamic IP address associated with the PBX identifier;
    continually updating the private, dynamic IP address using an address check module that determines when the first private IP address has changed to a different private IP address due to information changes regarding a PBX system on the network and informs an enhanced domain name system (DNS) server that the PBX system is using the different private IP address;
    establishing a virtual private network (VPN) connection between the PBX system and the enhanced DNS server comprising a central registry associated with the enhanced DNS server maintaining a communication channel with a PBX system, wherein if the communication channel is a VPN connection then the PBX system makes an outbound connection to a port at the enhanced DNS server;

storing the public IP address, the private, dynamic IP address, and the PBX identifier in the central registry; and providing the public IP address in response to a request from a remote IP device to access the PBX system associated with the single PBX identifier.

\* \* \* \* \*

UNITED STATES PATENT AND TRADEMARK OFFICE
CERTIFICATE OF CORRECTION

| | | |
|---|---|---|
| PATENT NO. | : 8,780,925 B2 | Page 1 of 1 |
| APPLICATION NO. | : 11/506279 | |
| DATED | : July 15, 2014 | |
| INVENTOR(S) | : Otto et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1622 days.

Signed and Sealed this
Ninth Day of February, 2016

Michelle K. Lee
*Director of the United States Patent and Trademark Office*